US008738757B2

(12) United States Patent
Allan et al.

(10) Patent No.: US 8,738,757 B2
(45) Date of Patent: May 27, 2014

(54) SYSTEM AND METHOD FOR VARIABLE-SIZE TABLE CONSTRUCTION APPLIED TO A TABLE-LOOKUP APPROACH FOR LOAD-SPREADING IN FORWARDING DATA IN A NETWORK

(75) Inventors: David Ian Allan, San Jose, CA (US); Eric Ward Gray, Pitman, NJ (US); Joel Halpern, Leesburg, VA (US); Scott Andrew Mansfield, Evans City, PA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 126 days.

(21) Appl. No.: 13/346,474

(22) Filed: Jan. 9, 2012

(65) Prior Publication Data

US 2012/0179800 A1   Jul. 12, 2012

Related U.S. Application Data

(60) Provisional application No. 61/431,250, filed on Jan. 10, 2011, provisional application No. 61/487,124, filed on May 17, 2011.

(51) Int. Cl.
*G06F 15/173* (2006.01)

(52) U.S. Cl.
USPC ............ 709/223; 710/15; 710/18; 710/29; 710/38

(58) Field of Classification Search
CPC .................................................. G06F 15/173

USPC ........................................................ 709/223
See application file for complete search history.

(56) References Cited

U.S. PATENT DOCUMENTS

| 8,014,278 | B1 | 9/2011 | Subramanian et al. | |
|---|---|---|---|---|
| 2004/0264374 | A1* | 12/2004 | Yu et al. | 370/230 |
| 2005/0038890 | A1* | 2/2005 | Masuda et al. | 709/224 |
| 2005/0276263 | A1 | 12/2005 | Suetsugu et al. | |
| 2006/0198381 | A1 | 9/2006 | Elangovan et al. | |
| 2009/0193105 | A1* | 7/2009 | Charny et al. | 709/223 |
| 2010/0265824 | A1* | 10/2010 | Chao et al. | 370/235 |
| 2012/0120803 | A1* | 5/2012 | Farkas et al. | 370/235 |
| 2012/0224477 | A1* | 9/2012 | Balasubramanian et al. | 370/230 |
| 2012/0239626 | A1* | 9/2012 | Aysan et al. | 707/674 |

* cited by examiner

*Primary Examiner* — Douglas Blair
*Assistant Examiner* — Mehulkumar Shah

(57) ABSTRACT

A network element disposed in a network, where the network element implements a process to manage load distribution across a plurality of network interfaces of the network. The network element redirects traffic flow directed toward the plurality of network interfaces in response to changes in configuration of the plurality of network interfaces, where each traffic flow is a set of protocol data units (PDUs), having an ordered delivery requirement, and where the PDUs are transmitted across the network between a source node and a destination node. The redirection process minimizes data traffic flow disruption when the load distribution is determined using a set of load distribution tables instead of a hashing algorithm.

20 Claims, 11 Drawing Sheets

| | N'-... | N'-4 | N'-... | N'-3 | N'-1 | ... | ... |
|---|---|---|---|---|---|---|---|
| N'-... | N'-3 | N'-5 | N'-4 | | N'-... | ... | ... |
| N'-2 | N'-1 | N'-... | N'-... | N'-5 | N'-2 | ... | ... |
| N'-2 | N'-5 | N'-... | N'-... | N'-1 | N'-5 | ... | ... |
| N'-4 | | N'-3 | | N'-... | N'-4 | ... | ... |
| N'-... | N'-1 | N'-... | N'-... | N'-3 | N'-2 | ... | ... |
| ... | ... | ... | ... | ... | ... | ... | ... |
| ... | ... | ... | ... | ... | ... | ... | ... |

FIG. 5

| N''-5 | N'-... | N'-4 | N'-... | N'-3 | N'-1 | ... | ... |
|---|---|---|---|---|---|---|---|
| N'-... | N'-3 | N'-5 | N'-4 | N''-1 | N'-... | ... | ... |
| N'-2 | N'-1 | N'-... | N'-... | N'-5 | N'-2 | ... | ... |
| N'-2 | N'-5 | N'-... | N'-... | N'-1 | N'-5 | ... | ... |
| N'-4 | N''-2 | N'-3 | N''-3 | N'-... | N'-4 | ... | ... |
| N'-... | N'-1 | N'-... | N'-... | N'-3 | N'-2 | ... | ... |
| ... | ... | ... | ... | ... | ... | ... | ... |
| ... | ... | ... | ... | ... | ... | ... | ... |

SYSTEM AND METHOD FOR VARIABLE-SIZE TABLE CONSTRUCTION APPLIED TO A TABLE-LOOKUP APPROACH FOR LOAD-SPREADING IN FORWARDING DATA IN A NETWORK

CROSS-REFERENCE TO RELATED APPLICATIONS

The present application claims the benefit under 35 U.S.C. §119 to U.S. Provisional Application Ser. No. 61/431,250, filed on Jan. 10, 2011, and U.S. Provisional Patent Application Ser. No. 61/487,124, filed on May 17, 2011. The foregoing applications, along with U.S. patent application Ser. No. 13/091,066, filed on Apr. 20, 2011, U.S. patent application Ser. No. 13/097,336, filed on Apr. 29, 2011, U.S. patent application Ser. No. 12/877,830, filed on Sep. 8, 2010, and U.S. patent application Ser. No. 12/877,826, filed on Sep. 8, 2010, are hereby incorporated by reference into the present application in their entirety for all purposes.

FIELD OF THE INVENTION

The embodiments of the invention relate to a method and system for improving load distribution in a network. Specifically, the embodiments of the invention relate to the improved use of a load distribution table populated with next hop discriminators to diminish disruption to data traffic in response to changes in the configuration of network interfaces associated with the data traffic at the network element.

BACKGROUND

A prevalent load spreading technique today is the spreading of traffic over a set of equal cost paths to a destination node referred to as equal cost multi-path (ECMP). However, in some implementations ECMP can have limitations in supporting operation, administration and management (OAM) functions and difficulties in evenly spreading a traffic load in asymmetrical topologies. ECMP has been implemented by using hashing algorithms and/or modulo operations on labels for multi-protocol label switching (MPLS) traffic, virtual local area network IDs (VLAN IDs) for layer 2 technologies, or header information from packets for layer 3 technology. These hashing algorithms and modulo operations are utilized to spread data traffic streams over the number of equal cost next hops in a network as a next hop selection mechanism for forwarding data traffic.

When a network forwarding device supports ECMP and this capability is enabled and there are multiple paths with the same (or similar) cost towards a specific destination, the network forwarding device will attempt to divide the load evenly across the set of equal cost next hops. Numerous techniques exist for distributing traffic over these equal cost next hops, those techniques with the most desirable properties are those that preserve flow ordering among protocol data units (PDUs), that is, all PDUs that have similar characteristics such as source, destination and header information, can be considered part of the same "flow" and preserving their ordering indicates that they arrive at their destination in the same order that they were sent by the source.

Existing load spreading techniques rely on the use of some form of hashing process that is applied per-PDU by a network forwarding device. Using such hashing techniques allows for large-scale determination of a collection of "flows" based on key fields in a PDU header. For example, a subset of source address and destination address bits can be used as input to a hashing function to group "flows" in such a way that all PDUs traveling from a particular source to a particular destination are considered part of the same gross-flow and forwarding all PDUs that are part of this gross-flow guarantees that no PDU within a subset flow will follow a different path and as a consequence potentially arrive out of order from the rest of the flow.

ECMP and similar hashing-based techniques have limitations in that in any irregular network or in any regular network that is in a failure scenario these techniques have difficulties with distributing the load evenly across the plurality of equal cost paths. This is because any particular hashing scheme that is selected in an attempt to evenly distribute PDU traffic across the set of paths is selected without regard to the actual layout of the network beyond the immediate set of next hops. The hashing scheme is typically not changed dynamically in a network failure scenario due to the disruption that would be caused, as a result the hashing scheme selected may not produce substantially even load distribution in the changed network topology.

SUMMARY OF THE INVENTION

A method in accordance with embodiments of the present invention is implemented in a network element in a network; the network element manages load distribution across a plurality of network interfaces of the network. The network element redirects traffic flow directed toward the plurality of network interfaces in response to changes in configuration of the plurality of network interfaces, where each traffic flow is a set of protocol data units (PDUs), having an ordered delivery requirement, that are transmitted across the network between a source node and a destination node. The method comprises the steps of generating, by a processor in the network element, a set of load distribution tables having a hierarchical relationship for mapping a traffic flow to a plurality of equal cost paths. The hierarchical relationship defining a child or parent relation for each load distribution table with another load distribution table in the set of load distribution tables, where a child load distribution table and a corresponding parent load distribution table in the set of load distribution tables provide alternate load distribution schemes for the traffic flow across the plurality of network interfaces relative to one another. The alternative load distribution schemes minimize changes to an initial load distribution scheme of the corresponding child load distribution table or parent load distribution table storing the generated set of load distribution tables in a load distribution table memory unit. The method also includes detecting, by the network element, a change in the configuration of the plurality of network interfaces corresponding to a first load distribution table from the set of load distribution tables, selecting a second load distribution table from among child load distribution tables or parent load distribution tables of the first load distribution table. The second load distribution table provides an alternative load distribution scheme to distribute traffic flow directed toward the plurality of network interfaces that minimizes changes to an initial load distribution scheme of the first load distribution table for the traffic flow. The network element reroutes the traffic flow in accordance with the alternative load distribution scheme of the second load distribution table while minimizing changes to the load distribution scheme of the first load distribution table for the traffic flow.

In accordance with embodiments of the present invention, a network element is disposed in a network, the network element manages load distribution across a plurality of network interfaces of the network. The network element redirects traffic flow directed toward the plurality of network interfaces in response to changes in configuration of the plurality of network interfaces, where each traffic flow is a set of protocol data units (PDUs) having an ordered delivery requirement. The PDUs are transmitted across the network between a source node and a destination node. The network element comprises a traffic forwarding module to forward each traffic flow toward the destination node according to a set of load distribution tables. The traffic forwarding module includes a load distribution table memory unit to store the set of load distribution tables and a network processor coupled to the traffic forwarding module. The network processor executes a load distribution table generating module and a load distribution table management module. The load distribution table generating module generates the set of load distribution tables. The load distribution tables have a hierarchical relationship for mapping a traffic flow to a plurality of equal cost paths. The hierarchical relationship defines a child or parent relation for each load distribution table with another load distribution table in the set of load distribution tables, where a child load distribution table and a corresponding parent load distribution table in the set of load distribution tables provide alternate load distribution schemes for the traffic flow across the plurality of network interfaces relative to one another. The alternative load distribution schemes minimize changes to an initial load distribution scheme of the corresponding child load distribution table or parent load distribution table. The load distribution table management module detects a change in a configuration of the plurality of network interfaces corresponding to a first load distribution table from the set of load distribution tables and selects a second load distribution table from among child load distribution tables or parent load distribution tables of the first load distribution table. The second load distribution table provides an alternative load distribution scheme to distribute traffic flow directed toward the plurality of network interfaces that minimizes changes to an initial load distribution scheme of the first load distribution table for the traffic flow.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 3 is a flowchart illustrating one embodiment of a table generation process.

FIGS. 4-11 are diagrams illustrating one embodiment of a sample set of load distribution tables for an equal cost interface group.

DETAILED DESCRIPTION

Figure 1:
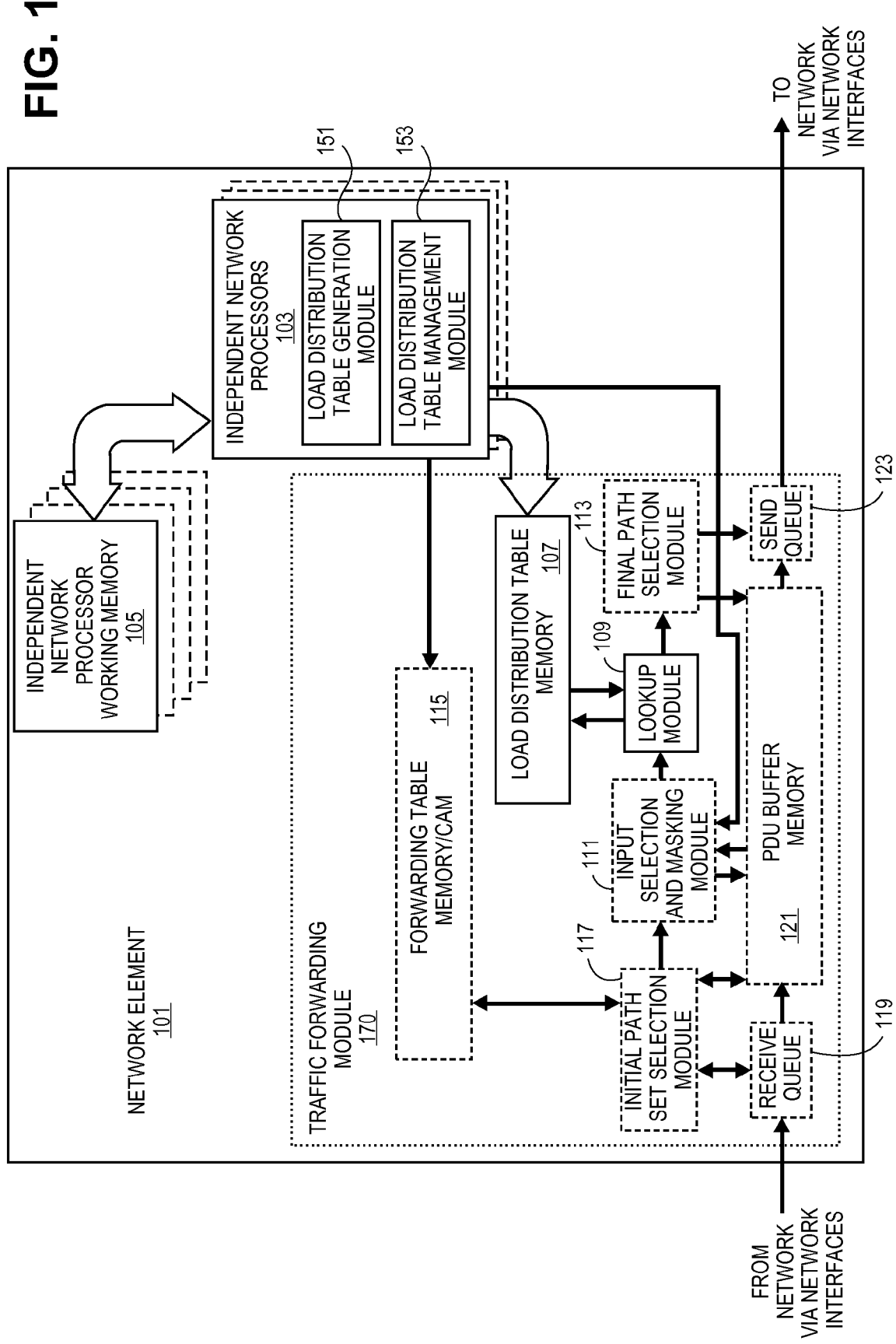
FIG. 1 is a diagram illustrating one embodiment of a network element.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the various flow charts as illustrated in the figures will be described with reference to the exemplary embodiments illustrated in the various diagrams as provided by figures. However, it should be understood that the operations of the flow charts can be performed by embodiments of the invention other than those discussed with reference to the diagrams, and the embodiments discussed with reference to the diagrams can perform operations different than those discussed with reference to the flow charts. As may be appreciated, embodiments of the invention are not limited to the examples illustrated in the figures.

The techniques shown in the figures can be implemented using code and data stored and executed on one or more electronic devices (e.g., an end station, a network element, etc.). Such electronic devices may store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more buses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly)) to edge network elements, which are coupled (e.g., through one or more core network elements to other edge network elements) to other end stations (e.g., server end stations).

The embodiments of the present invention provide a method and system for avoiding the disadvantages of the prior art. The disadvantages of the prior art are that poor lookup table management can lead to unnecessary data traffic disruption. patent application Ser. No. 12/877,826 discusses the use of an embedded entropy token used for flow based load spreading in an Ethernet mesh network. Similar concepts are applied to MPLS in the form of an entropy label as disclosed by patent application Ser. No. 12/877,830. patent application Ser. No. 13/091,066 proposes the use of an additional table for lookup of a specific interface identifier—or index into a set of interface identifiers—for use with load-spreading in forwarding data in a network as described in the above cases, which is referred to herein as a 'next hop discriminator value.'

An issue with the table lookup based implementations that the above patent application describes, is that dramatic changes in paths used for forwarding data traffic can occur as a result of a change in the number of available equal (or near-equal) cost paths resulting in a like-change in the number of output network interfaces determined to be available in a prior stage lookup. This change in paths can cause data traffic disruption to occur if the table population method used does not properly take into account the possibility that the number of network interfaces available can change leading to a replacement of many (if not most) of the next hop discriminator values used to determine forwarding path selection for individual PDUs that are part of common streams, thereby rerouting most of the data traffic in response to any change in the network interfaces that are available.

Changing the number of available network interfaces, if naively implemented, would redistribute the data traffic in such a way that a substantial fraction of all traffic flows could be briefly interrupted or more problematically cause our of order delivery for data traffic flows as the new hash/distribution scheme implemented by an updated table re-divided data traffic flows. For instance, assuming that the change was not especially pathological, a change from N network interfaces (where 1/N of the PDUs in the data traffic would be forwarded on each of the N network interfaces) to N+1 network interfaces could be expected to result in a redistribution of approximately $(1/(N^2+N))$ of the data traffic that would have been previously forwarded on each of the N network interfaces. Similarly, a decrease from N network interfaces to N−1 interfaces could be expected to result in increasing the load on each of the remaining N−1 network interfaces by $\sim(1/N^2-N))$ of the traffic previously forwarded on each of the N network interfaces that were previously usable.

The major issue is that moving traffic that comprises multiple streams from one path to another path has a non-zero probability of resulting in having one packet that is a part of a single stream being forwarded on a different path than an immediate preceding packet for the same stream, with the time delta between the two packets being sufficiently small that a packet sent later might be delivered earlier along the new path than another other packet in the same stream.

For certain network communication protocols, out-of-order delivery may be a severe problem. For most—if not all—network communication protocols, out-of-order delivery at least results in sub-optimal communication performance.

In one network communication protocol, all packets are numbered sequentially and a single missing sequence number may be interpreted to mean that the connection is broken. This may result in traumatic impact on any applications using this communication protocol. Incomplete transaction would need to be backed out, and client applications would be reset.

In one or more other communication protocols, missing packets are not detected using the presence or absence of particular sequence numbers, nor would the absence of a single packet necessarily be interpreted as loss of connectivity. However, allowing that packets may be delivered out of order means either always buffering packets for a sufficient time to ensure that any (or at least most) delayed packets can be re-inserted in sequence before being forwarded to a client application, or that some mechanism is used to detect this sort of buffering is required for a specific set of packets (detected as out of order). If a delay is used, this delay may limit the usefulness of the communication as it may mean that the communication protocol cannot be used for (for example) for real-time or interactive communicating applications.

In either of these approaches, out of order packets that cannot be re-ordered are treated as lost and this may have noticeable, even unacceptable impact on client application performance. For example, lost packets from a stream of video packets can result in noticeable visual effects (pixelation, or dark screens). Similarly lost audio packets can result in distortion or noise in an interactive conversation.

In most applications where multi-path is employed, the possibility of rare occasions of out-of-order delivery is considered acceptable up to a certain point. In addition, with roughly even distributions of any significant number of combined streams of traffic on a single relatively high-speed set of network connections, the potential that two or more packets in a single stream (within the aggregate of multiple streams) will arrive out of order with respect to each other is statistically insignificant (but non-zero) under normal conditions.

A change in network topology is not "normal conditions" however and there is clear evidence that there is a need to minimize the statistical likelihood of out of order delivery even under other than normal conditions. Minimizing the number of affected flows when there is a network topology change is a method of minimizing this statistical likelihood.

With the use of a lookup table that is populated by any arbitrarily complex scheme that is aimed solely at ensuring an uncorrelated population result, it is possible to choose a scheme with very poor redistribution results. Indeed, it is possible for the lookup table to have been populated in such a way that there are no common entries between the previous lookup table used to provide next hop discriminators for N network interfaces and the replacement lookup tables used for to select next hop discriminators for either N+1 or N−1 interfaces. This could cause all of the data traffic to be re-routed and consequently be substantially disrupted by the change. The embodiments of the invention overcome these disadvantages of the prior art. The disadvantages of the prior art are avoided by use of a generalized method that avoids this pathology. The generalized method involves selection of lookup table cell values iteratively by first computing a lookup table for a maximum N-value (N') and then extracting a subset of the cells in this lookup table to populate a lookup table corresponding to an N-value of N'−1. This method may then be applied successively until a table having a minimum N-value (e.g. −2) is obtained. Using this general approach ensures that the number of changes in path selection as a result of any change in the number of available network interfaces by 1 is minimal.

When equal cost multi-path (ECMP) or a similar load-spreading scheme is either desired or required, the mechanism used to accomplish the load spreading is based on a table lookup, as opposed to use of a hashing algorithm. The table lookup can be implemented as a multi-stage table lookup. The use of a table lookup and more specifically a multi-stage table lookup allows for a much larger number of values to be incorporated in the over-all processing where the values are generated with randomization algorithms of sufficient quality and complexity that these algorithms are not suitable for real-time operation, but these algorithms can reduce correlation over hashing algorithm based implementations that are practical to implement in a forwarding engine.

The lookup table used to determine which of multiple outgoing network interfaces will be used for a given PDU and can be populated using any arbitrarily complex computation scheme, referred to herein as a "distribution mechanism," as the table-loading process does not impact the steady-state PDU forwarding in any way. As a result, it is possible to eliminate any form of correlation. In addition, the load distribution table can be dimensioned in a way that is convenient for the lookup process. For example, if x-bits are taken from one field in the PDU under consideration and y-bits are taken from another, the load distribution table can be conveniently organized with $2^x$ rows and $2^y$ columns (or vice-versa). Distribution mechanisms to ensure that correlation does not exist for any specific network or topology can be arbitrarily complex as they can be applied in parallel with PDU forwarding by one or more independent network processors. All of the same techniques that could be applied to a hashing scheme (such as varying the input fields and bits used, or the specific algorithm chosen) can be similarly employed in the distribution mechanism for determination of the data to be loaded into the load distribution table, as well as how that data would be organized (dimensions to be used) in the table. In addition, the data could be deliberately altered (in ways not easily built into an algorithm) by using a "grooming process" to further eliminate correlation effects and ensure equal (or as near equal as possible) distribution of the PDU traffic load. This lookup table based approach is feasible with a relatively large number of bits across multiple bit fields.

While the lookup table can be populated using any arbitrarily complex distribution mechanism, to optimize the transition between lookup table in response to network interface configuration changes, the table-loading process can be restricted as described herein to minimize the change in path/interface selection resulting from a change in the number of available interfaces.

Because the lookup tables can be dimensioned in a way that is convenient for the lookup process, the dimensions of the table do not need to be changed to accommodate the implementation of the improved method of table generation and loading. This is because the x-bits can be taken from one field in the PDU under consideration and y-bits can be taken from another, making it convenient to organize the table with $2^x$ rows and $2^y$ columns (or vice-versa). Any change in the number of available networking interfaces (specifically, the outgoing or forwarding network interfaces) associated with equal-cost multi-path data traffic, does not need to impact the choice of input values used to select an entry in the table, thus changing the dimensioning of the table is not necessary to accommodate the improved table generation and loading method.

Avoiding changing the input bit information used for the lookup into the tables for load balancing as applied to an ECMP path selection mechanism diminishes the likelihood of significant changes to forwarding network interfaces used for any set of PDUs being forwarded using an ECMP based or ECMP-like load spreading process based on a table based distribution mechanism.

The improved table-loading process will make a minimal change to the distribution mechanism based on the number of available forwarding network interfaces for ECMP data traffic by adjusting the number of possible next hop discriminator values. The improved table-loading process does not, for example, simply re-map next hop discriminator value that corresponds to a network interface that is no longer part of the available network interfaces onto another network interface that remains available as this will result in an effective doubling of the traffic forwarded on that network interface.

Similarly, a fair distribution cannot be obtained when a new network interface is added to the available network interfaces by simply halving the traffic on one of the network interfaces that was previously available and distributing half of the traffic previously forwarded on that network interface over that network interface and the new network interface.

The improved table-loading mechanism is (as describe briefly above) to first populate a load distribution lookup table using the maximum number of possible network interface indexes and then iteratively to produce load distribution lookup tables having one less next hop discriminator, successively using any distribution mechanism that avoids the correlation issues discussed herein above, until finally a set of lookup tables is produced for all possible numbers of network interfaces and associated next hop discriminator between the maximum possible (specific to the system) and the minimum desirable (e.g., in many systems, two).

Network Element Architecture

FIG. 1 is a diagram illustrating one embodiment of a network element in accordance with the present invention. The network element includes a set of network processors 103, a set of network processor working memory devices 105, a load distribution table memory 107, a lookup module 109, an input selection and masking module 111, a final path selection module 113, a forwarding table memory or content accessible memory (CAM) 115, an initial path set selection module 117, a receiving queue 119, a PDU buffer memory 121, and a send queue 123. A 'set,' as used herein may refer to any positive whole number of items including one item. Each of these components of the network element 101 can be co-located or integrated with one another in any combination and at any level from an integrated circuit to the entire network element or even multiple network elements.

A receive queue 119 may be a storage device for storing incoming PDUs received on any network interface that are to be processed by the set of network processors 103. The receive queue 119 can have any size or storage capacity. Similarly, the PDU buffer memory 121 stores PDUs that are being processed by the network processor 103 and/or that are being prepared for forwarding. The send queue 123 may be a storage device for storing PDUs that are to be transmitted on any of the network interfaces of the network element 101.

An initial path set selection module 117 interfaces with the forwarding table memory 115 to determine a set of equal cost paths for forwarding incoming PDUs. The forwarding table memory 115 stores network topological data that enable the network element 101 to determine possible paths to destination addresses in received PDUs. The forwarding table memory 115 and initial input path set selection module 117 provide a set of equal cost paths to the input selection and masking module 111. This set of equal cost paths can be output to the input selection and masking module 111 explicitly, as a set ID that one or more subsequent functions can be used to determine the applicable set, or similarly output.

The input selection and masking module 111 gathers and in some embodiments masks the data which the specific path selection algorithm will use. In previous architectures, this information would then be fed to a hashing algorithm used to produce a next hop discriminator that would then be used to select a next hop from the set of possible next hops on a per-PDU basis. In the embodiments of the invention, this data is utilized to generate a load distribution table (if it doesn't already exist) and perform a lookup in the load distribution table. The input selection and masking module 111 works in combination with the load distribution table memory 107 and a lookup module 109, which replace the hashing function used in previous architectures. Also, the set of equal cost paths that are generated through the initial path set selection module 117 can be passed to the network processor 103 to generate the load distribution table or a set of load distribution tables as discussed further herein below.

The network processor 103 or a set of network processors may execute a load distribution table generation module 151 to generate a set of load distribution tables to spread the load of PDUs to be forwarded over the network. Any number of network processors 103 can be utilized in combination to generate the set of load distribution tables and other functions of the network element. One skilled in the art would understand that the processes and functions described herein can be divided across multiple network processors. For sake of clarity, an example with a single network processor 103 is described herein.

The process for generating the set of load distribution tables can start with the generation of a maximum or minimum number of network interfaces for the network element 100 and then iteratively calculate a load table using the distribution mechanism for each successive change in network interface configuration (i.e., incremental addition or subtraction of network interfaces) until a load distribution table is generated for the corresponding maximum or minimum number of network interfaces dependent on the starting point of the process. The load distribution table management module 151 can monitor the number of available network interfaces as well as the specific network interfaces available and adjust the current selected load distribution table accordingly.

The network processor 103 can utilize dedicated network processor working memory 105 to execute all the functionality of the network processor 105. Any type of random access memory and any amount of random access memory can be present within the network element 101 or external to the network element 101 for use by the network processor 103.

In one embodiment, the network processor 103 generates the set of load distribution tables in the working memory 105 to be stored in the load distribution table 107. Load distribution tables to be used by the network elements are loaded into the load distribution table memory after creation and population using the distribution mechanism. After loaded into the load distribution table memory 107, the lookup module can index into them using the input from the input selection and masking module 111. The load distribution table memory 107 can be any type of storage device including random access memory. In one embodiment, the load distribution table memory 107 is a content accessible memory (CAM), where the load distribution table entries can be accessed by direct input from the lookup module 109. The load distribution table memory 107 can have any size or configuration that is sufficient to store the load distribution tables generated by the network processor 103.

The lookup module 109 may be a discrete device or function integrated with other devices and functions of the network element 101. The lookup module 109 can receive any combination of input selection data from the input selection and masking module 111 to determine a table cell in a load distribution table containing a next hop discriminator. An index or identifier for a particular table can also be provided by the input selection and masking module 111. The next hop discriminator value of the table cell corresponding to the input from the input selection and masking module 111 may be retrieved from the load distribution table memory and output to the final path selection module 113.

The final path selection module 113 receives the next hop discriminator value from the lookup table 109 and uses this value to determine a network interface that a PDU may be forwarded through to a next hop destination that is a part of the next hop identified by the received next hop discriminator. The final path selection module 113 can maintain a mapping of next hop discriminator values with network interfaces that can be dynamically adjusted dependent on changes in the network interface configuration of the network element. In other embodiments, this mapping may be maintained by or in conjunction with the load distribution table management module. The final path selection module 113 may then provide the network interface information to the send queue 123 or manages the transmission of the send queue 123 such that the PDU may be transmitted through the selected network interface.

The components that receive, lookup and forward the PDUs can be collectively referred to as the traffic forwarding module 170. One skilled in the art would understand that the functions and structures of the traffic forwarding module 170 can be re-arranged or integrated into different combinations and sub-combinations of components.

Load Distribution Table Generation and Table Loading Process

The improved load table generation and loading process or load distribution scheme handle a topology change in the network that results in a change in the number of next hops to a given destination through a corresponding set of network interfaces, but may not change the distance metric for the given destination. The improved load table generation and loading process can also handle reconfigurations of the network element hardware that may affect the number of next hops to a given destination, but also do not change the distance metric for the given destination. The set of next hops to a given destination is referred to herein as an equal cost interface group.

There are two aspects of this process, load distribution table generation and table loading. The process first constructs a set of load distribution lookup tables such that the impact of changing from using one load distribution table to using another load distribution table is minimized. Separate load distribution tables are used for N, N+1 and N−1 possible network interfaces in any given equal-cost interface group. N as used herein can represent any positive integer value. An 'equal cost interface group' as used herein refers to a set of network interfaces available to forward a data traffic flow of related PDUs toward its destination. Thus, changing the number of available network interfaces for the equal cost interface group requires changing the load distribution table used to determine a next hop discriminator value that indexes into the given equal cost interface group. The process then updates the selected load distribution table for an equal cost interface group when a new network interface is added or an existing network interface is rendered unusable for the equal cost interface group.

Figure 2:
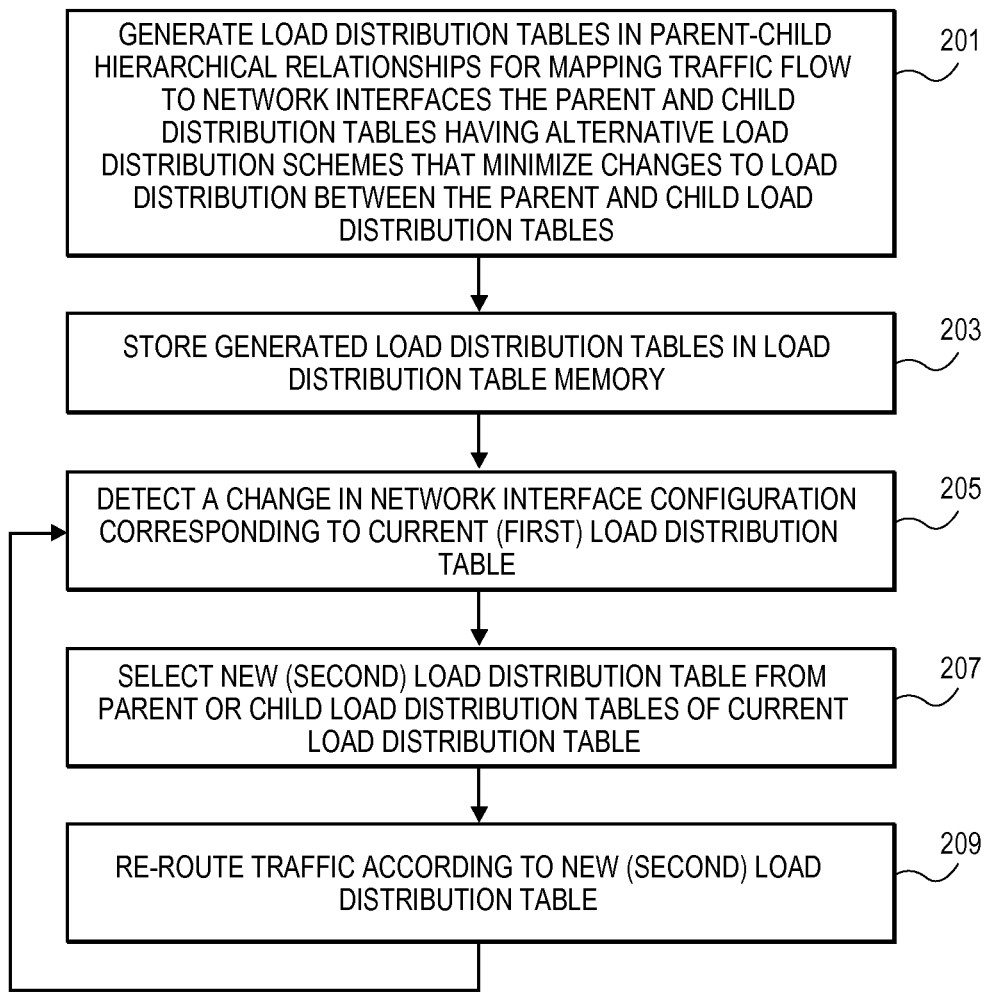
FIG. 2 is a flowchart illustrating one embodiment of an improved load table generation and load distribution process.

FIG. 2 is a flowchart of one embodiment of an improved load table generation and table loading process. In one embodiment, the process can be initiated by generating a set of load distribution tables for each equal cost interface group of the network element (Block 201). This process can be executed as each equal cost interface group is formed or similar timing. The set of load distribution tables for a given equal cost interface group can be iteratively generated where the set includes a separate load distribution table for each number of network interfaces from a minimum to a maximum possible for the network element. Each load distribution table is generated with a distribution mechanism such that the number changes to table cell values is minimized relative to the N+1 and N−1 load distribution tables in the set, where N is the number of network interfaces for a given load distribution table.

The set of load distribution tables have a hierarchical parent-child relationship, where the parent load distribution tables are the N+1 load distribution tables and the child load distribution tables are the N−1 load distribution tables for each load distribution table in the set where a given load distribution table has N network interfaces. The parent and child load distribution tables, therefore have alternative load distribution schemes relative to one another with the difference between the load distribution schemes being minimized to minimize the corresponding disruption to data traffic forwarding caused by switching between parent and child load distribution tables.

The generated set of load distribution tables for each equal cost interface group may then be stored in the load distribution table memory (Block 203). In other embodiments, only a currently selected or in-use load distribution table may be stored in the load distribution table memory, while other load distribution tables may be stored in another storage location. In a further embodiment, only a subset of the set of load distribution tables for an equal cost interface group my be generated. In this embodiment, other members of the set of load distribution tables can be generated in response to changes in the network interface configuration for the equal cost interface group. The load distribution table generation and storage can be managed by the load table generation module executed by the network processor.

The load distribution table management module can monitor or detect changes in network interface configuration affecting the currently selected load distribution table for an equal cost interface group (Block 205). In response to detecting a change in the network interface configuration, the load distribution table management module can select a new load distribution from the set of load distribution tables from the child or parent load distribution table of the current load distribution table (Block 207). The network interface configuration can change in response to changes in network topology or in response to changes in network element configuration.

The newly selected load distribution table can be loaded in the load distribution table memory or the lookup module can be redirected to the newly selected load distribution table by the load distribution management module. The use of the newly selected load distribution table will cause some data traffic for the equal cost interface group to be redirected. However, the effects of the data traffic redirection will be minimized as the difference between the newly selected load distribution table and the previously selected load distribution table is minimized while still accounting for the change in network interface configuration and avoiding correlation issues (Block 209).

Figures 3, 4:
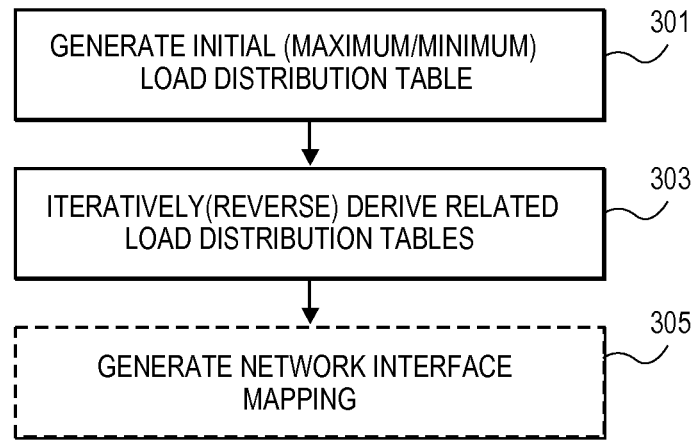

FIG. 3 is a flowchart of the load table generation process. The process is initiated by generating an initial load distribution table for an equal cost interface group (Block 301). The initial table can be a table populated according to the distribution scheme to spread the load over a maximum number of network interfaces, a minimum number of network interfaces or any number of network interfaces between the maximum and minimum. For sake of clarity the example of a maximum is primarily utilized herein. However, one skilled in the art would understand that the principles and features described in relation to the maximum network interface embodiment are applicable to the other embodiments.

After the initial load distribution table has been created using the distribution mechanism, the process can then continue by iteratively generating the remainder of the load distribution tables in the set (Block 303). Each iteration can remove a network interface (or add, if a minimum is the starting point) and generate a new load distribution table that may be the child of the previous load distribution table. The new child load distribution table may change a minimum number of table cells to redistribute the load over the remaining network interfaces by reassigning a set of table cells corresponding to the lost network interface to the remaining network interfaces. This process continues creating new child load distribution tables with fewer and fewer network interfaces until a minimum number of network interfaces remain, such as two network interfaces. If the initial table uses a minimum number of network interfaces as a starting point then the process iteratively adds network interfaces and redistributes a subset of table cells from the network interfaces to accommodate the added network interface.

In one embodiment, after all of the set of load distribution tables are created a mapping of the table cell values to the network interfaces is created (Block 305). The load distribution tables can store next hop discriminator values or similar values. These values can have a direct correspondence with network interfaces or can be dynamically mapped to network interface providing a level of indirection in the relationship of the next hop discriminator values and the network interfaces allowing any network interface to be lost or added and the mappings dynamically adjusted to minimize the redistribution of next hop discriminator values between parent and child load distribution tables.

FIGS. 4-11 are diagrams that illustrate one example embodiment of a set of load distribution tables. The illustrated set of load distribution tables are constructed such that the impact on data traffic for a corresponding equal cost interface group is minimized. In particular, data traffic flow re-ordering resulting from a network interface configuration change is minimized when it is necessary to change the load distribution table within the set that is used. The FIGS. 4-11 are provided by way of example and not limitation to the load table generation process and the distribution mechanism that is used to populate the example set of load distribution tables.

In this example, the maximum number of possible network interfaces that may be part of any equal cost interfaces group is referred to as N'. In the example, as a first step an initial load distribution table is constructed using any arbitrarily complex distribution mechanism in such a way as to provide the desired distribution of data traffic for an equal cost interface group without undesirable correlation effects. The initial load distribution table (illustrated in FIG. 4) may be constructed (in the example given) in two dimensions of arbitrary values, such that each cell contains one of the next hop discriminator values associated with the N' maximum possible number of interfaces. The example load distribution table uses next hop discriminator values that monotonically increase from 1 through N' and the example shows entries in the table of N', N'-1, N'-2, N'-3, N'-4, and N'-5. N'- . . . is used to show that other values exist in the load distribution table as well. The values shown in FIG. 4 (as well as in all FIGS. 5-14 as well) are intended to be illustrative, rather than limiting.

Figures 7, 8:
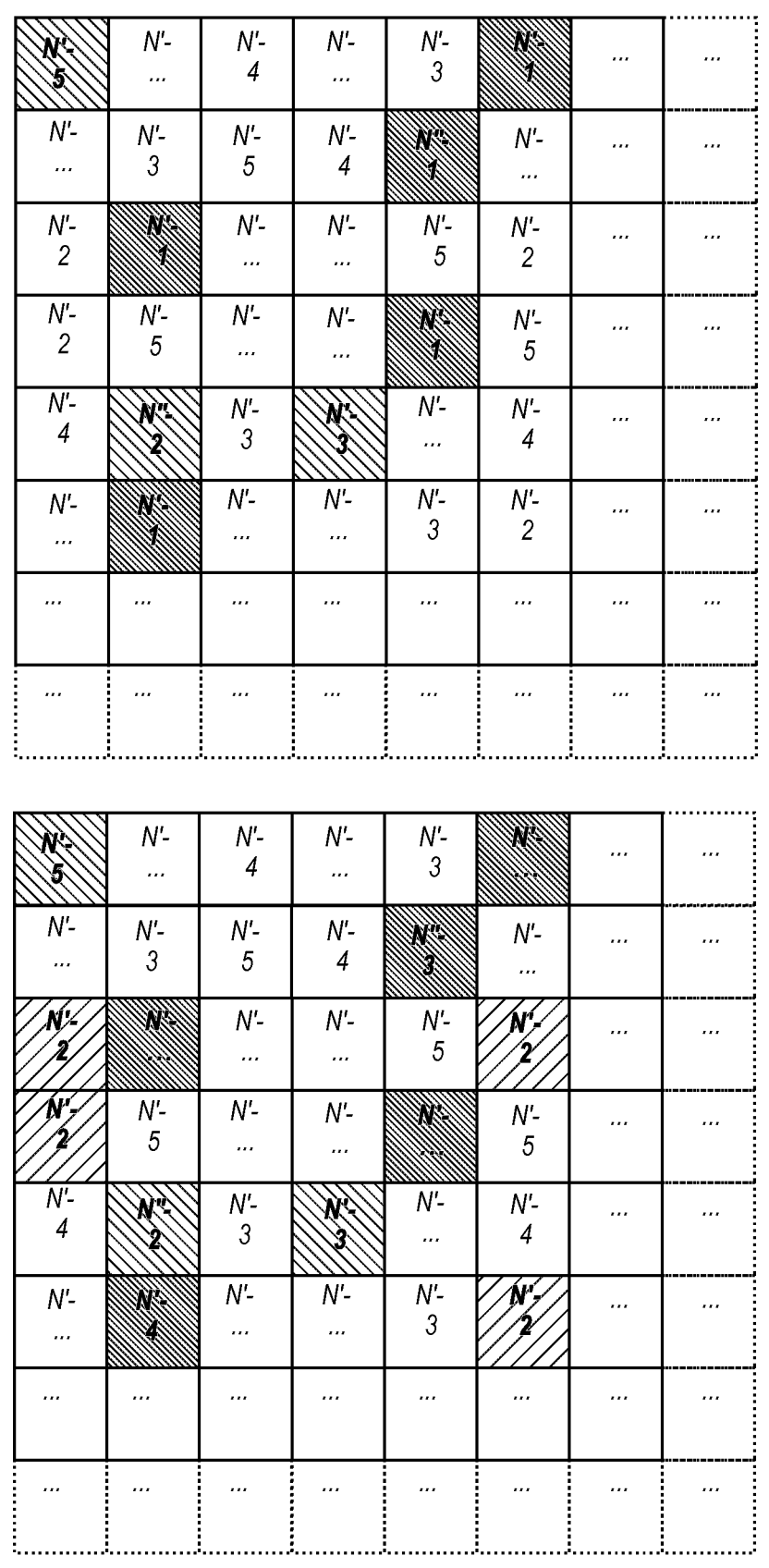

After the initial load distribution table (FIG. 4) is constructed, a transform algorithm (i.e., a distribution mechanism) may be used to convert this initial load distribution table to a congruent child load distribution table that contains only (in this example) the next hop discriminator value entries 1 through N'-1. The application of the distribution mechanism is illustrated in FIGS. 5, 6 and 7 as follows: (1) the cells in the initial load distribution table containing the next hop discriminator value N' are marked and the value removed (FIG. 5); (2) the same (or a similar) distribution mechanism as that which was used to populate the initial load distribution table is then used to re-populate the marked entries; (3) the result is a congruent child load distribution table having only the next hop discriminator values 1 through N'-1 (FIG. 6), where no cell already having one of these values is affected. This second table does not replace the initial load distribution table, but serves as a child of that initial load distribution table and is separately stored. The second load distribution table is then similarly subjected to the analogous process, marking cells having the next hop discriminator value N'-1 (FIG. 7) and re-populating the newly marked cells with next hop discriminator values ranging from 1 through N'-2 resulting in the load distribution table in FIG. 8. The load distribution table in FIG. 8 is thus a child of the load distribution table of FIG. 6.

Figures 9, 10:
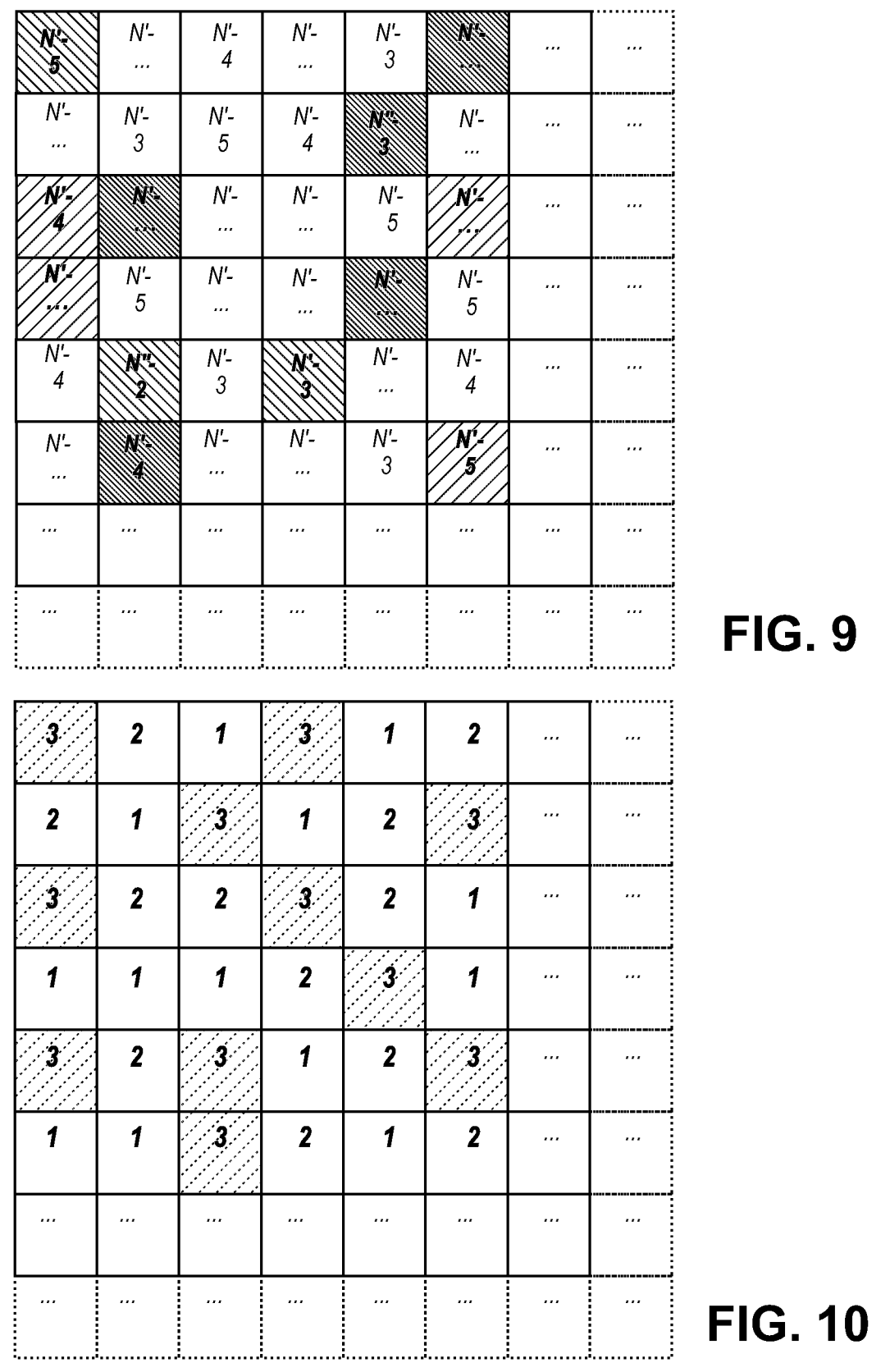
Figure 11:
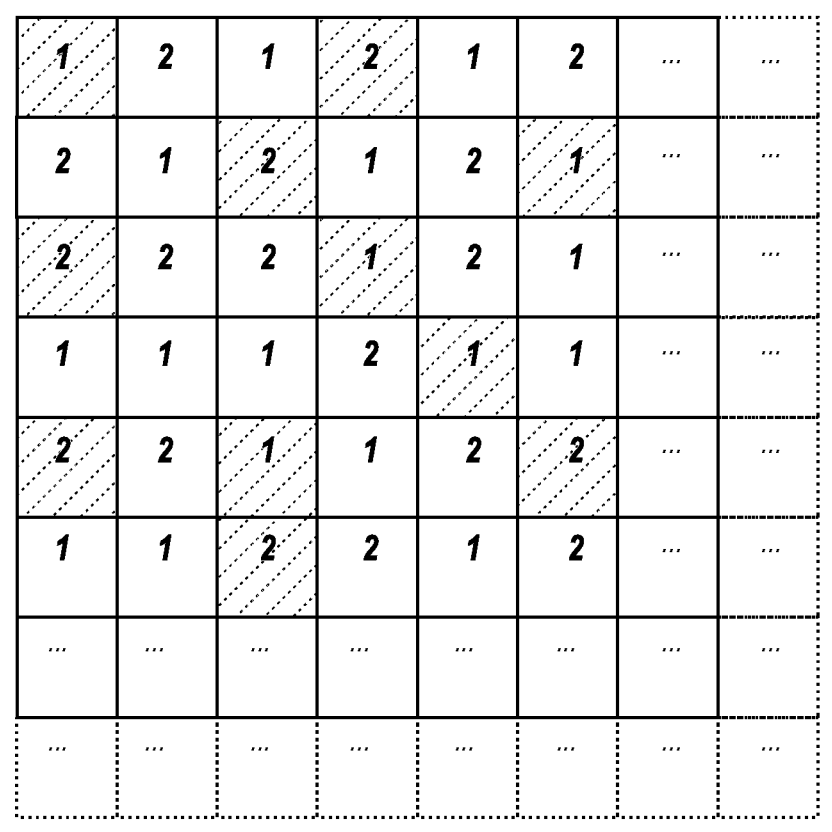

This process proceeds to a next iteration by marking N'-2 entries (FIG. 9) and replacing these with next hop discriminator values ranging from 1 through N'-3 (simplified here in FIG. 10 to values 1-3). This process is iteratively repeated until a load distribution table containing only two next hop discriminator values is created (FIG. 11). A table with a single entry is not useful, so is not constructed.

At the end of this process, we have constructed N'-1 congruent load distribution tables having a hierarchical parent-child relationship between the load distribution tables, where the difference between cell contents in any two parent-child load distribution tables containing N a result, the lookup results will differ in a minimum number of cases for each such cell change when a change in network interface configuration requires a change in corresponding load distribution tables. The network interface configuration change is brought about by either an increase (or a decrease) in the number of next hop discriminator values sought from the lookup. This in turn may be brought about by the addition (or removal) of one network interface as a result of a network topology transition, network element configuration change or other similar activity.

Figure 12:
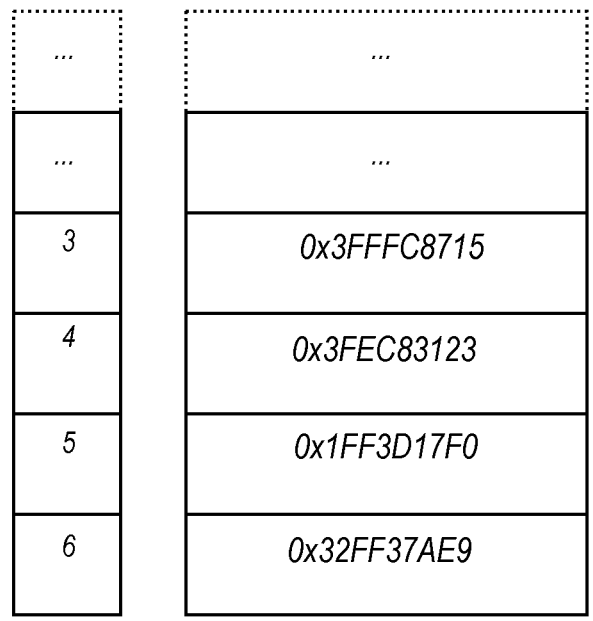
FIGS. 12 and 13 are diagrams illustrating one embodiment of an example of equal cost interface group having a network interface added.
Figure 13:
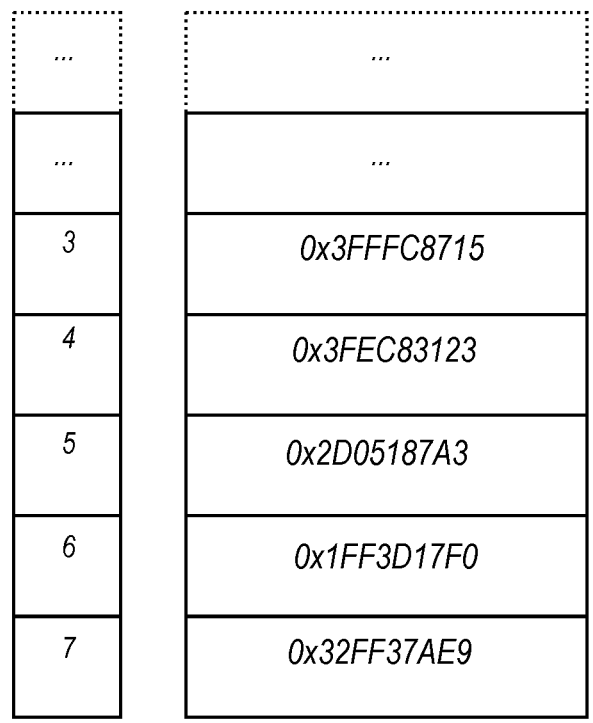
Figure 14:
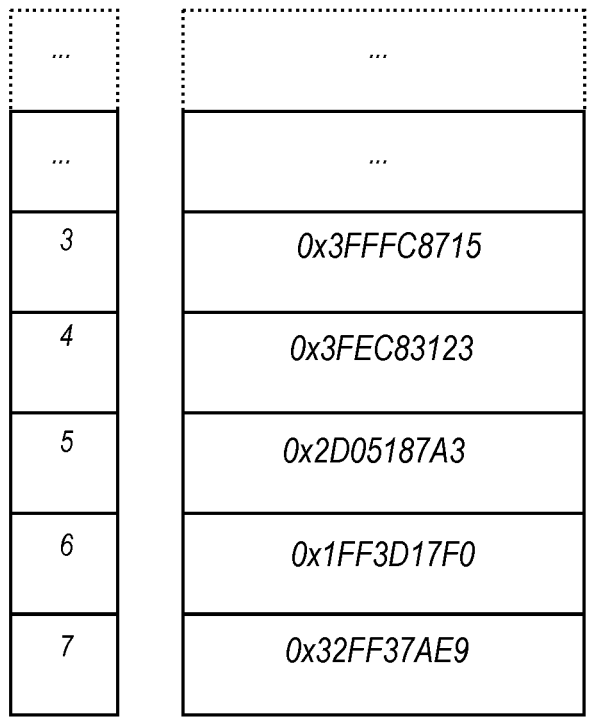
FIGS. 14, 15, 16 and 17 are diagrams illustrating one embodiment of an example equal cost interface group where a network interface is lost.
Figure 15:
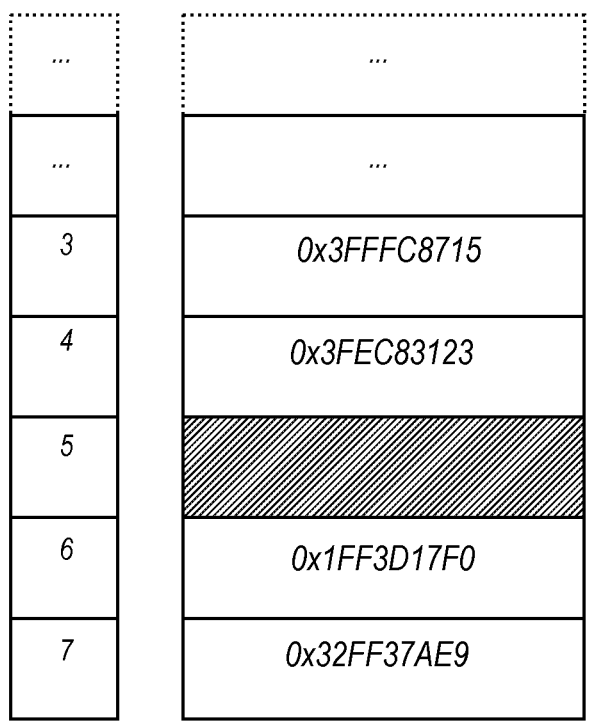
Figure 16:
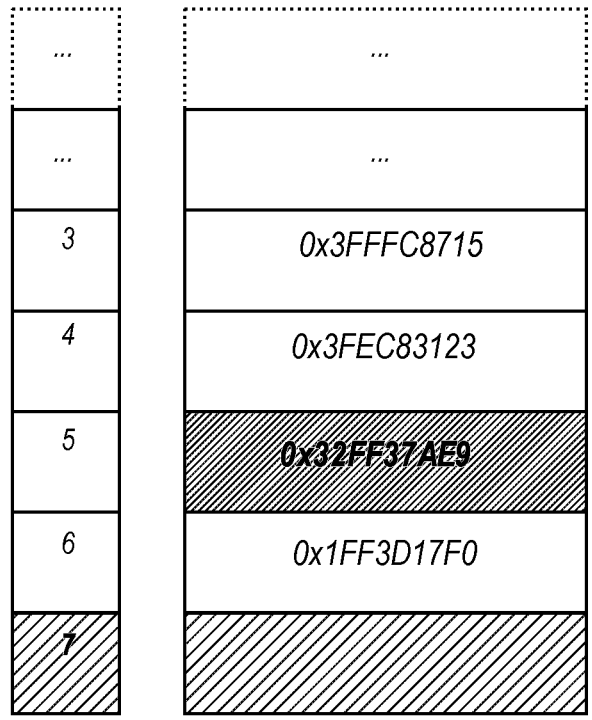
Figure 17:
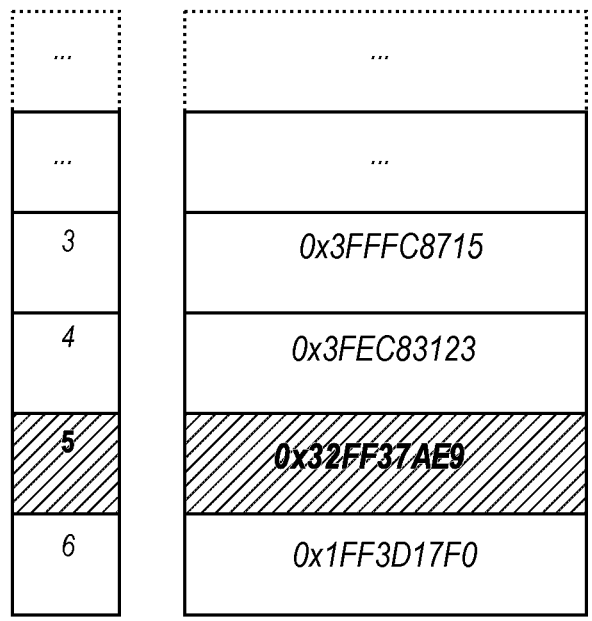

FIGS. 11 and 12 are diagrams illustrating one embodiment of an example equal cost interface group where a network interface is added. The diagrams provide an example of how an equal cost interface group would be updated by the addition of a new interface. The equal cost interface group in FIG. 12 has six network interface members represented by next hop discriminator values . . . and 3-6 (left column), four of which include example network interface identifiers (right column). A new network interface can be added to the group by simply appending it to the list and giving it the next higher next hop discriminator value (FIG. 13). This equal cost interface group can serve as the mapping data structure between the next hop decimators of the load distribution tables and the network interface identifiers.

Making the update to the equal cost interface group in this manner ensures that in going from the load distribution table containing six possible next hop discriminator values to the load distribution table containing seven possible next hop discriminator values there is a minimal change to the data traffic associated with the equal cost interface group. The redistribution will be at least as good as the ideal transition expected in using an ideal hash scheme, since some portion of the traffic flowing over each of the previous six interfaces is now expected to be forwarded on the (new) seventh interface, with the improvement that no change is experienced by those flows that are not redistributed to the new interface.

FIGS. 14, 15, 16 and 17 are diagrams of an example equal cost interface group where a network interface is lost. The example illustrated equal cost interface group demonstrates the method to be used in updating the equal cost interface group when an existing interface is rendered unusable. This example is intended to be illustrative of the worst case for network interface loss. The equal cost interface group initially (FIG. 14) includes seven possible network interfaces with next hop discriminator values (left column) and network interface identifiers (right column). In the trivial case (not shown), the network interface associated with the highest next hop discriminator value would be the one being removed. This is simply the reverse of the case described above for adding a new interface, and can easily be visualized by imagining an update for the group corresponding to transitioning from FIG. 13 to FIG. 12.

However, in the worst case, the network interface rendered unusable would be one of those associated with a next hop discriminator value that is lower than the maximum value, for reasons which should become clear in the following description. Because the load distribution tables are constructed using the above described process method, to allow successive congruent load distribution tables to be constructed where each successive (parent-child) load distribution table is the result of removing the highest next hop discriminator value in one load distribution table and replacing it with one of the possible lower values, there will be only tables with consecutive next hop discriminator values.

There will not be, for example, a table containing only the next hope discriminator values 1-4, and 6-7 as would be needed to be able to use the load distribution table as it would be (illustrated in FIG. 15) if the network interface associated with next hop discriminator value five (5) were to become unusable. Shifting the contents of the equal cost interface group (by for instance moving the network interface associated with next hop discriminator value 6 to next hop discriminator value 5, and the network interface associated with next hope discriminator value 7 to next hope discriminator value 6) will affect all of the data traffic previously forwarded on these shifted network interfaces.

To minimize the impact of the load distribution table change, the network interface in the highest index position can be moved to replace the network interface of the next hop discriminator value that was made invalid (FIG. 16), and then the highest next hop discriminator value can be removed (FIG. 17), and the equal cost interface group would now be accessed via the lookup table associated with six (6) possible next hop discriminator values.

This process will actually distribute the data traffic of two network interfaces across the surviving set of network interfaces in comparison with the absolute ideal of only distributing the data traffic of the failed network interface, but this process has the advantage of minimizing the amount of state required to be tracked and producing a consistent response independent of the order of events.

Figure 18:
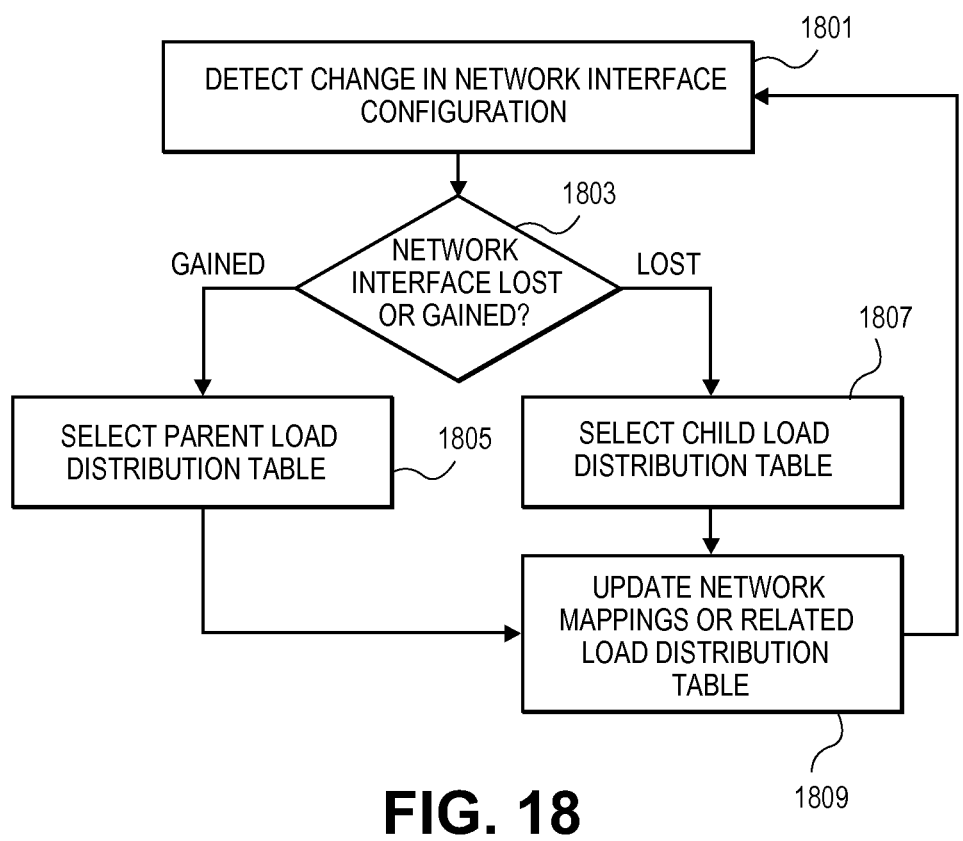
FIG. 18 is a flowchart illustrating one embodiment of the load distribution table management process.

FIG. 18 is a flowchart of one embodiment of the load distribution table management process. This process can be executed by a load distribution table management module or similar process to determine which load distribution table of a set of load distribution tables should be utilized for load distribution in response to changes in available network interfaces for an equal cost interface group.

In one embodiment, the process may be initiated after an equal cost interface group is created along with a set of load distribution tables for spreading data traffic across the set of network interfaces associated with the equal cost interface group. Detection of a change in network topology, network element configuration or similar changes in network interface configuration can trigger the process (Block 1801). A check may be made to determine whether the change in network interface configuration is a loss or gain of a network interface (Block 1803). This process can be equal cost interface group specific, which separate instance of the load distribution table management process monitoring the network interface configuration for each equal cost interface group.

If the network interface configuration is changed by a gain of a network interface, then a parent load distribution table is loaded or identified for use by the lookup module (Block 1805). If however, the network interface configuration is changed by a loss of a network interface, then the child load distribution table is loaded or identified for use by the lookup module (Block 1807). In either case, the mappings (e.g., in the equal cost interface group) between the next hop discriminator values of the currently selected load distribution table and the network interface identifiers are then updated to maintain a set of consecutive next hop discriminator values (Block 1809). The process then continues in response to a detection of further changes in the network interface configuration (Block 1801).

Alternative Table Construction

In one embodiment, a load distribution table construction can be employed that overcomes some of the above-described limitations related to single network interface failures, but at the expense of state. If a maximum of 'N' network interfaces are needed to be supported, then it will require order ($2^n$) load distribution tables. Such load distribution tables need to be constructed in a way that minimizes the data traffic disruption for any single failure, with multiple failures being a secondary consideration.

There are multiple sets of events that would lead to multiple failure scenarios that can happen in any order. Ensuring minimum disruption of data traffic in every possible transition is not entirely a tractable proposition when contrasted with the need for quality randomization in the load distribution tables. Hence this alternative process only seeks to guarantee minimum disruption of data traffic during a subset of these possible network interface transitions, achieved by the choice of a root set when generating load distribution tables for an additional network interface failure.

The alternative load distribution table generating distribution mechanism is to construct a bitmap of the available set of network interfaces, so for example the load distribution table index for a first, third and fourth network interface would be 1101B or '13'. The load distribution table construction is as described above, except that the starting point may be to generate a table with N network interfaces, then a subsequent set of tables is produced with each network interface removed from the set in turn, and the index value corresponding to that index value replaced with a distribution of the surviving index value set, and the load distribution table with the lowest unsigned number in the set is selected for generation of the next group of tables, where the procedure of step two is repeated for the set of network interfaces, which has been diminished by one.

So as a practical example, the generation of a load distribution table set with five network interfaces may require the generation of 26 tables, which corresponds to $2^n$-n-1. This is because degenerate cases of only 1 or no network interfaces whatsoever are removed from the set.

In this example, the first load distribution table may be 11111B, corresponding to all five network interfaces available. Using a generalized form of the techniques described above, all the single failure derivative load distribution tables for a five network interface set are generated. These may be 10111B, 11011B, 11101B, 11110B and 01111B.

Using a generalized form of the techniques described above, all double failure derivative load distribution tables of a five network interface set are then generated. Root selection in this case may be arbitrary. Starting from 11110B-11100B and 11001B are generated. Starting from 11101B-10101B and 11010B are generated. Starting from 11011B-10011B is generated. Starting from 10111B-10110B is generated.

Using a generalized form of the techniques described above, triple failure derivative load distribution tables of a five network interface set may be generated. Starting from 11100B-11000B is generated. Starting from 10101B-10100B is generated. Starting from 10011B-10010B is generated. Starting from 10110B-10001B is generated.

For the generation of the next group in the set of load distribution tables, the root load distribution table to use is table 01111B as the lowest unsigned table identifier. Again using the generalized techniques described above, the single failure derivate load distribution tables of a four interface set may be generated. These are 01001B, 01010B, 01011B, 01100B, 01101B, 01110B and 00111B.

For generation of the next group in the set of load distribution tables, the root table may be 00111B as the lowest unsigned load distribution table identifier. Again using the generalized techniques described above, the set of tables that are a derivative of a three network interface sets may be generated. These are 00110B, 00101B and 00011B. At this point load distribution table generation is complete as tables 00001B and 00010B have only one network interface, which are degenerate cases.

With the above technique the load distribution tables constructed will ensure an absolute minimum of traffic is disrupted for any transition from N network interfaces available to N+1 or N−1.

In regard to the N+1 case, there are at least two possible ways of dealing with this scenario. In one case, a new network interface may be handled as described above in regard to equal cost interface group updates. In another case, sufficient information may be stored about the lost network interface to allow detection of the case where the same network interface has been restored.

If a new network interface does not exactly correspond to a network interface that was previously lost, or there is no relevant information about a lost network interface associated with the use of the affected load distribution table, then the process reverts to treating it as a new network interface. The latter approach can be advantageous, because the former approach can have poor performance if a network interface is coming and going repeatedly.

The expected utilization of the above set of load distribution tables is when a node comes up and is performing its Dijkstra computations; it will encounter sets of equal cost paths and will perform an initial mapping of the number of next hops to the fault free load distribution table for that number of network interfaces. For example, three network interfaces will correspond to table 00111B, four network interfaces to 01111B, etc.

The problem of addressing the order of events can be partially addressed by not maintaining a full table set at a given time, but maintaining the current set for unfailed network interfaces augmented to ensure the set of the current network interface state for N+1, N and N−1 exists on the assumption that the additional required tables can be computed faster than the mean time between failures. This works for additional failures but cannot predict the order with which network interfaces will be restored to service.

In the example above the load distribution table derivation tree was pre-assigned to offer maximum probability that a randomly selected combination of multiple failures had a minimal impact. Selecting the roots for derivation based on the actual network state in anticipating failures can ensure the ideal of 1/N of the traffic being disrupted by any individual failure in rare multiple failure scenarios holds true.

Other Alternative Embodiments

Exhaustive Table Construction

This alternative embodiment for load distribution table construction follows the previously described alternative embodiment, except that new load distribution tables are constructed in the N−2 case using each load distribution table constructed in the N−1 case. This process is repeated for N−3, etc. for M total iterations (where N−M=2)—i.e. this is repeated until load distribution tables have been constructed for cases 2 . . . N.

This alternative embodiment would seem to result in the construction of O(N!) load distribution tables, however, using the notation described above, analysis shows that it actually only results in $O(2^{(N+1)})$ load distribution tables. The analysis is illustrated as follows:

```
11111 => {01111, 10111, 11011, 11101, 11110}
01111 => {00111, 01011, 01101, 01110}
10111 => {00111, 10011, 10101, 10110}
11011 => {01011, 10011, 11001, 11010}
11101 => {01101, 10101, 11001, 11100}
11110 => {01110, 10110, 11010, 11100}
```

In the above notation, strike-out tables are those already constructed in an earlier step and thus are redundant and do not need to be separately maintained. Carrying this process through demonstrates that one load distribution table will be constructed for all binary numbers between 00000 and 11111—hence the total number of load distribution tables would be $2^{(N+1)}$ load distribution tables, or twice as many as in the example above.

This approach would allow for multiple network interface loss with a minimum impact on existing flows. It would also consume twice as much table space as the approach above, and involve a slightly more complicated set of transitions.

Introducing an Additional Level of Indirection

As pointed out in regard to equal cost network interface group management, a limitation of that approach is that traffic on two network interfaces can be impacted in the transition from N to N−1 network interfaces. This is because of swapping network interface index associations when the network interface that goes away (for whatever reason) is not the one associated with the highest next hop discriminator (i.e. an index to lookup a network interface). In this case, effectively all of the traffic that would have been forwarded on the now-missing network interface will be forwarded on the network interface that was associated with the highest next hop discriminator value, while that traffic will now be distributed over all remaining network interfaces including the network interface it was being forwarded on previously.

One way to avoid this behavior is to introduce another level of indirection. In this approach, the indexes in each load distribution table correspond to a row in another load distribution table that has indexes that correspond to rows in the table where network interfaces are found. The term indexes will be used for this example embodiment, as the additional level of indirection makes the 'next hop discriminator' term less appropriate, though also an index, the indexing in this example embodiment provides less of a direct correspondence with a network interface for forwarding.

In this approach, ECMP lookup tables would be constructed as described in the equal cost interface group section above. The difference consists entirely of how redirection occurs in a failure scenario. For example, if there are five network interfaces in an ECMP group, identified as A, B, C, D, and E, then the ECMP lookup table for five network interfaces would have index values 0 through 4. These would be indexes into a table which may look like this:

TABLE I

| Index-In | Index-out |
|----------|-----------|
| 0 | 0 |
| 1 | 1 |
| 2 | 2 |
| 3 | 3 |
| 4 | 4 |

Where Index-out is used to index the network interfaces table:

TABLE II

| Index-out | Network interface |
|-----------|-------------------|
| 0 | A |
| 1 | B |
| 2 | C |
| 3 | D |
| 4 | E |

If for instance, network interface B goes away in this ECMP group, then the following steps would be taken. A new index-indirection table is constructed as follows (where indexes in the index-out column are simply shifted to fill the slot made available by the corresponding missing network interface):

TABLE III

| Index-In | Index-out |
|----------|-----------|
| 0 | 0 |
| 1 | 2 |
| 2 | 3 |
| 3 | 4 |

This indirection table would then be used to index the same network interface table as before, but values would be picked for this indirection lookup using the table for four network interfaces.

Since the lookup table for four network interfaces was constructed from the lookup table for five network interfaces by effectively redistributing cells that corresponded to the highest index by assigning one of the lower index numbers to each of those cells, the effect would be to redistribute the traffic that would previously have been forwarded on network interface B across network interfaces A, C, D and E. Since the new index indirection table shifts network interface indexes, traffic that would have used a network interface from the set (A, C, D and E), will still be forwarded on the same network interface.

This alternative load distribution table construction approach has some limitations such as the modification of the index-indirection table needs to remain specific to the ECMP group affected by any specific network interface loss (i.e.—a simple modification of an index indirection table for all ECMP groups that have either four or five network interfaces in them is not possible). This means that a mechanism is needed to indicate that a modified index indirection table applies to a specific affected ECMP group. Possible tracking mechanisms would be to use a distinct ECMP group identifier or to include a pointer to an index indirection table in each cell of the ECMP lookup table. However, this could result in significantly larger lookup tables. In addition, the extra step of indirection complicates the forwarding process.

In one embodiment, the system and methods described herein can be implemented as a set of hardware devices (e.g., within a network element). In another embodiment, the system components are implemented in software (for example microcode, assembly language or higher level languages). These software implementations can be stored on a non-transitory computer-readable medium. A non-transitory "computer-readable" medium can include any medium that can store information. Examples of the computer-readable medium include a read only memory (ROM), a floppy diskette, a CD Rom, a DVD, a flash memory, a hard drive, an optical disc or similar medium.

Thus, a method, system and apparatus for efficient way to manage network interface transitions for PDU forwarding and load spreading in a network element has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented in a network element in a network, the network element to manage load distribution across a plurality of network interfaces of the network element, the network element to redirect traffic flow directed toward the plurality of network interfaces in response to changes in configuration of the plurality of network interfaces, wherein each traffic flow is a set of protocol data units (PDUs), having an ordered delivery requirement, that are transmitted across the network between a source node and a destination node, the method comprising the steps of:

generating, by a processor in the network element, a set of load distribution tables having a hierarchical relationship for mapping a traffic flow to a plurality of equal cost paths, the hierarchical relationship defining a child or parent relation for each load distribution table with another load distribution table in the set of load distribution tables, wherein a child load distribution table and a corresponding parent load distribution table in the set of load distribution tables provide alternate load distribution schemes for the traffic flow across the plurality of network interfaces relative to one another, the alternative load distribution schemes to minimize changes to an initial load distribution scheme of the corresponding child load distribution table or parent load distribution table;

storing the generated set of load distribution tables in a load distribution table memory unit;

detecting, by the network element, a change in the configuration of the plurality of network interfaces corresponding to a first load distribution table from the set of load distribution tables;

selecting a second load distribution table from among child load distribution tables or parent load distribution tables of the first load distribution table, the second load distribution table to provide an alternative load distribution scheme to distribute traffic flow directed toward the plurality of network interfaces that minimizes changes to an initial load distribution scheme of the first load distribution table for the traffic flow; and rerouting, by the network element, the traffic flow in accordance with the alternative load distribution scheme of the second load distribution table while minimizing changes to the load distribution scheme of the first load distribution table for the traffic flow.

2. The method of claim 1, wherein the detecting the change in the configuration of the plurality of network interfaces comprises the steps of:

detecting a loss of a network interface from the plurality of network interfaces; and selecting a child load distribution table of the first load distribution table, where the child load distribution table represents the loss of the network interface by having a redistribution of cells associated with the lost network interface to remaining network interfaces in the plurality of network interfaces.

3. The method of claim 1, wherein the detecting the change in the configuration of the plurality of network interfaces comprises the steps of:

detecting a gain of a network interface for the plurality of network interfaces; and selecting a parent load distribution table of the first load distribution table, where the parent load distribution table represents the gain of the network interface by having a redistribution of cells associated with original network interfaces to the gained network interface for the plurality of network interfaces.

4. The method of claim 1, wherein generating the set of load distribution tables comprises the steps of:

generating a load distribution table for a maximum number of network interfaces for the plurality of network interfaces; and deriving a plurality of load distribution tables from the load distribution table for the maximum number of network interfaces, by applying a transform algorithm to iteratively remove a network interface until a load distribution table for a minimum number of network interfaces is generated.

5. The method of claim 1, wherein generating the set of load distribution tables comprises the steps of:

generating a load distribution table for a current number of network interfaces for the plurality of network interfaces; and reverse deriving a load distribution table from the load distribution table for the current number of network interfaces, by applying a transform algorithm to add a network interface to the load distribution scheme of the load distribution table of the current number of network interfaces.

6. The method of claim 1, wherein generating the set of load distribution tables comprises the steps of:
indexing the set of load distribution tables using a bitmap to represent available network interfaces for the plurality of network interfaces.

7. The method of claim 1, wherein the set of load tables identifies each of the plurality of network interfaces with a network interface index, further comprising the steps of:
maintaining a table mapping load distribution table values to network interface identifiers; and
maintaining a mapping of equal cost multipath groups to load distribution tables.

8. The method of claim 1, wherein each load distribution table includes a plurality of cells and each of the plurality of cells stores a network interface identifier for one of the plurality of network interfaces.

9. The method of claim 1, wherein each child load distribution table alters the assignment of approximately 1/N amount of the traffic relative to the corresponding parent load distribution table, wherein N is a number of network interfaces distributed by the corresponding parent load distribution table.

10. The method of claim 1, wherein each parent load distribution table alters the assignment of approximately 1/N+1 amount of the traffic relative to the corresponding child load distribution table, wherein N is a number of network interfaces distributed by the corresponding child load distribution table.

11. A network element in a network, the network element to manage load distribution across a plurality of network interfaces of the network element, the network element to redirect traffic flow directed toward the plurality of network interfaces in response to changes in configuration of the plurality of network interfaces, wherein each traffic flow is a set of protocol data units (PDUs), having an ordered delivery requirement, that are transmitted across the network between a source node and a destination node, the network element comprising:
a traffic forwarding module embodied as a set of instructions stored on a non-transitory computer readable medium executed on one or more processors of the network element operable to forward each traffic flow toward the destination node according to a set of load distribution tables, the traffic forwarding module including a load distribution table memory unit to store the set of load distribution tables; and
a network processor coupled to the traffic forwarding module, the network processor to execute a load distribution table generating module embodied as a set of instructions stored on a non-transitory computer readable medium executed on one or more processors of the network element and a load distribution table management module embodied as a set of instructions stored on a non-transitory computer readable medium executed on one or more processors of the network element, the load distribution table generating module to generate the set of load distribution tables, the load distribution tables having a hierarchical relationship for mapping a traffic flow to a plurality of equal cost paths, the hierarchical relationship defining a child or parent relation for each load distribution table with another load distribution table in the set of load distribution tables, wherein a child load distribution table and a corresponding parent load distribution table in the set of load distribution tables provide alternate load distribution schemes for the traffic flow across the plurality of network interfaces relative to one another, the alternative load distribution schemes to minimize changes to an initial load distribution scheme of the corresponding child load distribution table or parent load distribution table;
the load distribution table management module to detect a change in a configuration of the plurality of network interfaces corresponding to a first load distribution table from the set of load distribution tables and to select a second load distribution table from among child load distribution tables or parent load distribution tables of the first load distribution table, the second load distribution table to provide an alternative load distribution scheme to distribute traffic flow directed toward the plurality of network interfaces that minimizes changes to an initial load distribution scheme of the first load distribution table for the traffic flow.

12. The network element of claim 11, wherein the load distribution table management module detects a loss of a network interface from the plurality of network interfaces, and selects a child load distribution table of the first load distribution table, where the child load distribution table represents the loss of the network interface by having a redistribution of cells associated with the lost network interface to remaining network interfaces in the plurality of network interfaces.

13. The network element of claim 11, wherein the load distribution table management module detects a gain of a network interface for the plurality of network interfaces, and selects a parent load distribution table of the first load distribution table, where the parent load distribution table represents the gain of the network interface by having a redistribution of cells associated with original network interfaces to the gained network interface for the plurality of network interfaces.

14. The network element of claim 11, wherein the load distribution table generating module generates a load distribution table for a maximum number of network interfaces for the plurality of network interfaces, and derives a plurality of load distribution tables from the load distribution table for the maximum number of network interfaces, by applying a transform algorithm to iteratively remove a network interface until a load distribution table for a minimum number of network interfaces is generated.

15. The network element of claim 11, wherein the load distribution table generating module generates a load distribution table for a current number of network interfaces for the plurality of network interfaces, and reverse derives a load distribution table from the load distribution table for the current number of network interfaces, by applying a transform algorithm to add a network interface to the load distribution scheme of the load distribution table of the current number of network interfaces.

16. The network element of claim 11, wherein the load distribution table generating module indexes the set of load distribution tables using a bitmap to represent available network interfaces for the plurality of network interfaces.

17. The network element of claim 11, wherein the set of load tables identifies each of the plurality of network interfaces with a network interface index, wherein the load distribution table management module maintains a table mapping load distribution table values to network interface identifiers, and maintains a mapping of equal cost multipath groups to load distribution tables.

18. The network element of claim 11, wherein each load distribution table includes a plurality of cells and each of the plurality of cells stores a network interface identifier for one of the plurality of network interfaces.

19. The network element of claim 11, wherein each child load distribution table alters the assignment of approximately 1/N amount of the traffic relative to the corresponding parent load distribution table, wherein N is a number of network interfaces distributed by the corresponding parent load distribution table.

20. The network element of claim 11, wherein each parent load distribution table alters the assignment of approximately 1/N+1 amount of the traffic relative to the corresponding child load distribution table, wherein N is a number of network interfaces distributed by the corresponding child load distribution table.

* * * * *

UNITED STATES PATENT AND TRADEMARK OFFICE
CERTIFICATE OF CORRECTION

| | |
|---|---|
| PATENT NO. | : 8,738,757 B2 |
| APPLICATION NO. | : 13/346474 |
| DATED | : May 27, 2014 |
| INVENTOR(S) | : Allan et al. |

Page 1 of 1

It is certified that error appears in the above-identified patent and that said Letters Patent is hereby corrected as shown below:

In the Specification

In Column 9, Lines 45-46, delete "module 151" and insert -- module 153 --, therefor.

In Column 11, Line 40, delete "my be" and insert -- may be --, therefor.

Signed and Sealed this
Sixteenth Day of September, 2014

Michelle K. Lee
*Deputy Director of the United States Patent and Trademark Office*